(12) United States Patent
McKinnis

(10) Patent No.: US 8,070,492 B1
(45) Date of Patent: Dec. 6, 2011

(54) READING TOOL WITH DISPLAY WINDOW FOR TEACHING EYE TRACKING

(76) Inventor: Sandra McKinnis, Anchorage, AK (US)

( * ) Notice: Subject to any disclaimer, the term of this patent is extended or adjusted under 35 U.S.C. 154(b) by 585 days.

(21) Appl. No.: 12/229,739

(22) Filed: Aug. 26, 2008

(51) Int. Cl.
*G09B 17/00* (2006.01)

(52) U.S. Cl. ......... 434/178; 434/179; 434/181; 434/183

(58) Field of Classification Search .................. 434/178, 434/181, 183, 179
See application file for complete search history.

(56) References Cited

U.S. PATENT DOCUMENTS

| | | | | |
|---|---|---|---|---|
| 140,135 | A * | 6/1873 | Hildreth | 434/178 |
| 651,894 | A * | 6/1900 | Shermer | 451/445 |
| 2,493,668 | A * | 1/1950 | Gonzalez | 434/167 |
| 2,699,748 | A * | 1/1955 | Crawford | 116/236 |
| 2,735,193 | A * | 2/1956 | Moulton | 434/179 |
| 2,996,813 | A * | 8/1961 | Taylor | 434/182 |
| 3,287,827 | A * | 11/1966 | Lippman | 434/348 |
| 3,328,898 | A * | 7/1967 | Raba | 434/183 |
| 3,783,531 | A * | 1/1974 | Kattenhorn | 434/181 |
| 7,056,122 | B2 * | 6/2006 | Lockett | 434/181 |
| 7,565,759 | B1 * | 7/2009 | Brennan | 40/124.01 |
| 2008/0173232 | A1 * | 7/2008 | Smith | 116/240 |

* cited by examiner

*Primary Examiner* — Gene Kim
*Assistant Examiner* — Joseph B Baldori
(74) *Attorney, Agent, or Firm* — Michael J. Tavella

(57) ABSTRACT

A device that assists students in reading by using an opaque sheet to cover an entire page. The sheet has a "window" slot in the center that highlights a single line on the page. The device also has a curved slider that is pivotably attached at the top of the sheet. The placement of the pivot point and the shape of the curved member are such that in the initial position, the entire slot is covered. The student moves the curved slider letter by letter until syllables and words are exposed. As letters, syllables and words are exposed, the student reads them. At no time is the student distracted by other text on the page or the remaining words on the line. Once the line has been mastered, the slider can be returned to the initial position and the sheet slid down to the next line to repeat the process.

13 Claims, 6 Drawing Sheets

READING TOOL WITH DISPLAY WINDOW
FOR TEACHING EYE TRACKING

CROSS REFERENCE TO RELATED
APPLICATIONS

Not Applicable

STATEMENT REGARDING FEDERALLY
SPONSORED RESEARCH AND DEVELOPMENT

Not Applicable

BACKGROUND OF THE INVENTION

1. Field of the Invention

This invention relates to reading tools and particularly to a decoding reading tool with a display window.

2. Description of the Prior Art

The majority of children who are struggling with learning to read have visual and/or language based deficits. Deficits in visual perception and processing, or in the language based skills of phonological processing, and/or comprehension may be seen. Of interest here are the visual processing difficulties these children exhibit. It is common for struggling readers to be visually overwhelmed by the amount of print on a page, to have trouble with eye tracking smoothly from left to right, to have trouble visually isolating one word from another and/or with perceiving each letter within a word. Consequently, learning to decode words and developing an adequate sight word vocabulary is a struggle for these children.

Other devices have been developed to aid in reading instruction. However, none of these is completely effective for the types of deficiencies mentioned above. U.S. Pat. No. 6,358,059 discloses a decoding wheel that can be used to teach the sounds of letter combinations, but is not directly related to reading print on a full page as viewed in a book.

U.S. Pat. No. 4,445,864 discloses a device that has a housing and a paper tape with rotatable spools. A student can view letters and words though a display window. This enables a student to progressively pronounce and decode words letter by letter. However, the device is limited in what can be displayed, and cannot be used with a printed book.

U.S. Pat. No. 4,979,902 discloses a device for restricting the field of vision of a reader, limiting that field to a narrow focus. While this device allows a reader to practice while viewing a standard page, it restricts the reader to only one narrow field of view. Thus, the device has no means to expand that field of view as the student improves.

U.S. Pat. No. 4,055,908 teaches a device that can be used on a printed page. It works like a typing stand. A page is held in a clipboard and sliding frame is positioned above the page. The frame obscures a line of text and has a slider that reveals one letter, syllable or word to enable students to decode a word on the page. While this device can be used on a page, it is difficult to use it on a book. Moreover, the frame only covers one or two lines of the text. Often students are confused and distracted by the totality of words on a page. This device does nothing to alleviate that.

Along the lines of the last device, several devices are commercially available to aid in reading. These devices can be used with books as well as plain pages. Typically, they obscure a portion of a page and highlight one line of text for reading. The problem with these devices is the same as the latter device. Because they do not obscure the entire page, they cannot easily highlight a specific letter or letter combination.

Finally, a device designed to help readers track across a page has two frames that highlight a letter or two on a page. The device is designed to be slid across a page as the student reads. Again, the problems with this device are the inability to obscure the entire page and the inability to expand the viewing "window" beyond one or two letters.

BRIEF DESCRIPTION OF THE INVENTION

The instant invention overcomes all of these above deficiencies. It is a device that uses an opaque sheet, in a basic or beginners model that covers an entire page. It has a "window" slot in the center of the sheet that is used to highlight a single line on the page. The device also has a curved slider that is pivotably attached at the top of the sheet. The placement of the pivot point and the shape of the curved member are such that in the initial position, the entire slot is covered. The student, with the assistance of the teacher, can move the curved slider letter by letter until syllables and words are exposed. As each letter or syllable is exposed, the student can read it. As each word is exposed, the student can read that. At no time is the student distracted by other text on the page or the remaining words on the line. As the slider advances, the student can progress through a line, letter by letter, syllable-by-syllable, or word-by-word, through the entire line. Once the line has been mastered, the slider can be returned to the initial position and the sheet slid down to the next line where the process can be repeated. In this way, the student can gain confidence in reading words and lines quickly without being distracted by other words on the line or page.

In an advanced design, the sheet can be semi-transparent. This allows a student to partially see the other words on a page, while not being totally confused by them. This allows a student to gain further confidence in reading and focusing on the words at hand, while viewing a full page of text.

It is also possible to design the slider in the form of a fish, which may be amusing to younger children to help hold their interest in using the tool.

DETAILED DESCRIPTION OF THE INVENTION

Figure 1:
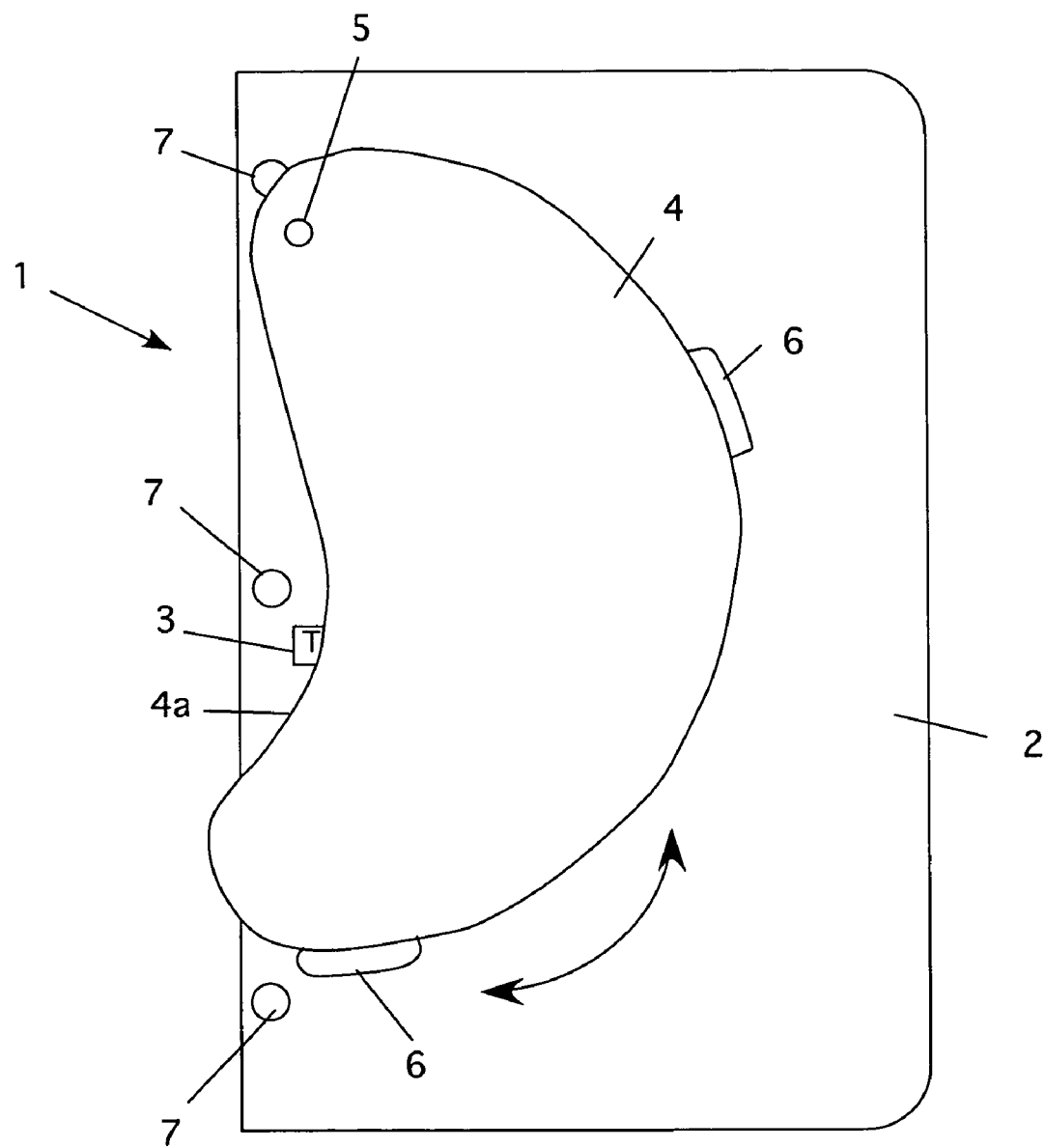
FIG. 1 is a top view of a small embodiment of the invention on a page with the slider in the initial position revealing one letter of a line on a page.

Referring now to FIG. 1, a top view of a small embodiment of the invention is shown on a page with the slider in the initial position revealing one letter of a line on the page. The eye tracker window reading tool 1 has a plastic page overlay 2 that has a rectangular window 3 cutout on the page overlay 2. The rectangular window 3 accommodates print sizes from 12 to 18 point (see FIG. 3 for a full view of the window). A moveable slider 4 is slidably attached to the page overlay 2 using a fastener 5. The placement of the fastener 5 is dependent upon the shape and size of the slider 4. The shape of the slider is formed so that the trailing edge 4a of the slider is generally perpendicular to the lateral axis of the rectangular window. This allows precise control of the slider so that one letter at a time can be exposed. Note that the slider must be wide enough to cover the entire window at the beginning of the process.

As shown in the figure, this edge is revealing only one letter of the line. The slider 4 has tabs 6 that are formed on the slider, which can be bent upwards to form grips. The tabs 6 allow the teacher or student to easily control the movement of the slider across the surface of the page overlay 2. Note that the slider can move in either direction as indicated by the arrows shown.

Note that this figure includes holes 7. These holes are optional and are used to keep the device in a three ring binder for storage.

Figure 2:
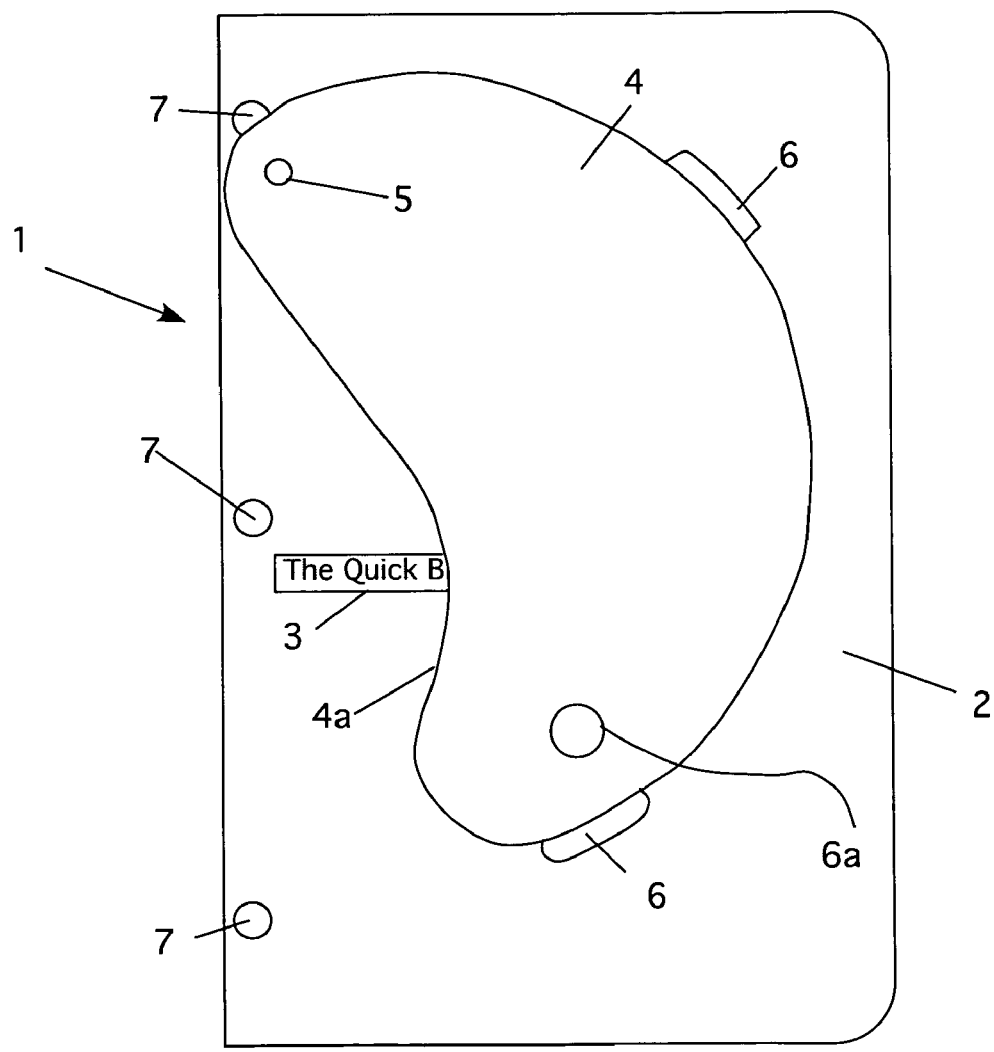
FIG. 2 is a top view of the small embodiment of the invention on a page with the slider in an advanced position revealing some words of a line on a page.

When placed over a page with the top overlay rotated out of the way a single line of print can be exposed. The top overlay can also be rotated oblique to the window to expose the line of print letter by letter from left to right. The reader can choose to expose only a single letter, groups of letters, or words, as needed for their decoding effort. FIG. 2 is a top view of the small embodiment of the invention on a page with the slider in an advanced position revealing some words of a line on a page. Here, two words and a single letter have been revealed. Note how the trailing) edge 4a remains generally perpendicular to the window.

Note also in this view, an optional finger hole 6a can be added either in addition to or in place of the tabs 6.

The decoding (or eye tracker) window reading tool is designed to allow the child or teacher to control the amount of print exposed. Reducing the amount of print with which the child has to contend allows the child to focus more on the actual decoding process in the following ways. The top overlay can be rotated to exposed single letters (see FIG. 1) for sound-by-sound decoding in words with a one to one correspondence between phonemes and letters such as the word "cat". Groups of letters that correspond to a single phoneme can also be exposed as the "sh" in "show' or the "oa in "boat", or the child can rotate the top overlay to expose entire words or phrases within the line of print framed by the rectangular window (see FIG. 2).

Figure 3:
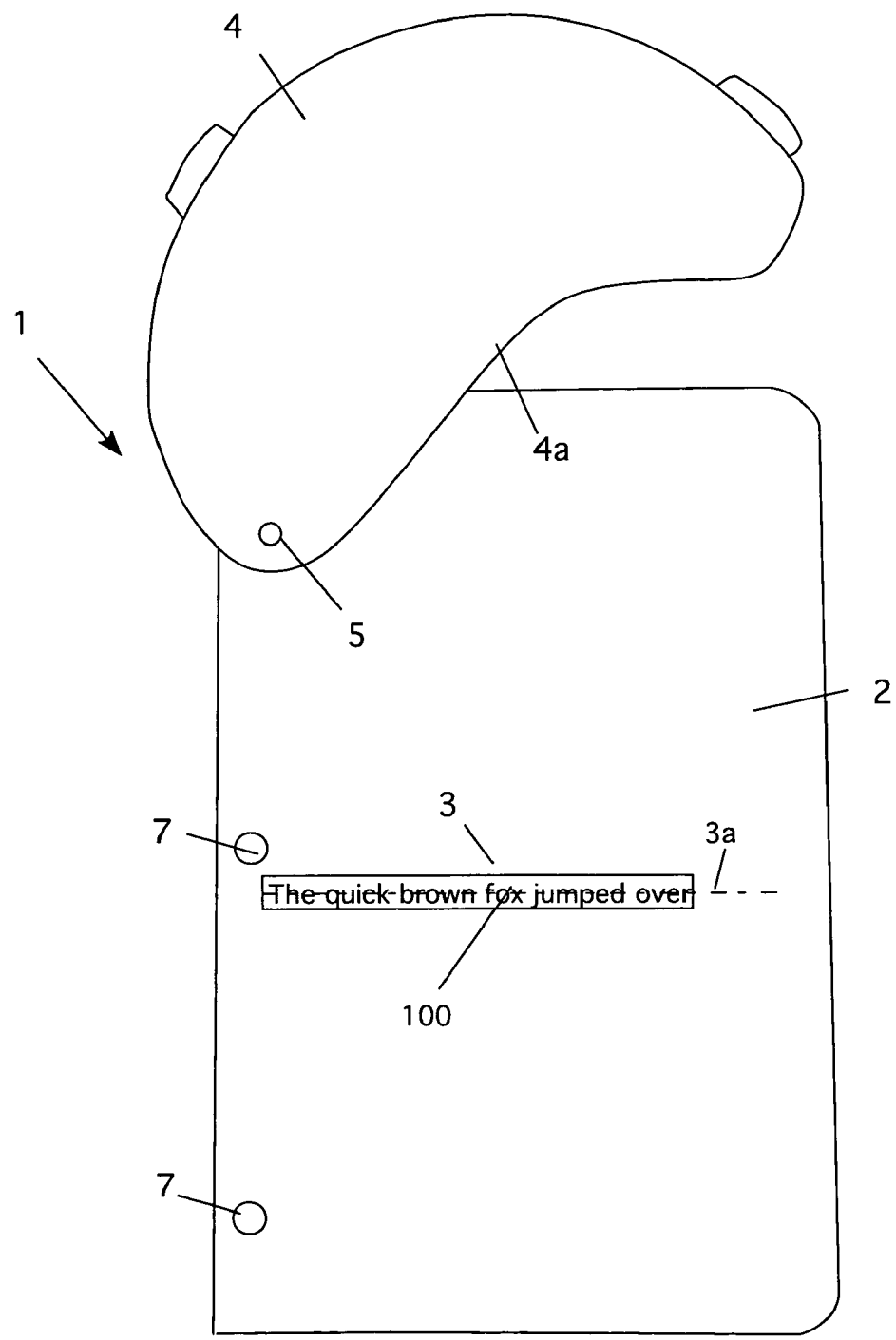
FIG. 3 is a top view of the small embodiment of the invention showing the slider rotated upwards to show the slot and a line of text.

FIG. 3 is a top view of the small embodiment of the invention showing the slider rotated upwards to show the slot and a line of text. Here, the slider 4 is rotated into a position solely to show the window 3. Note that the dashed line 3a represents the lateral axis of the window 3. The line of text 100 is shown.

Figure 4:
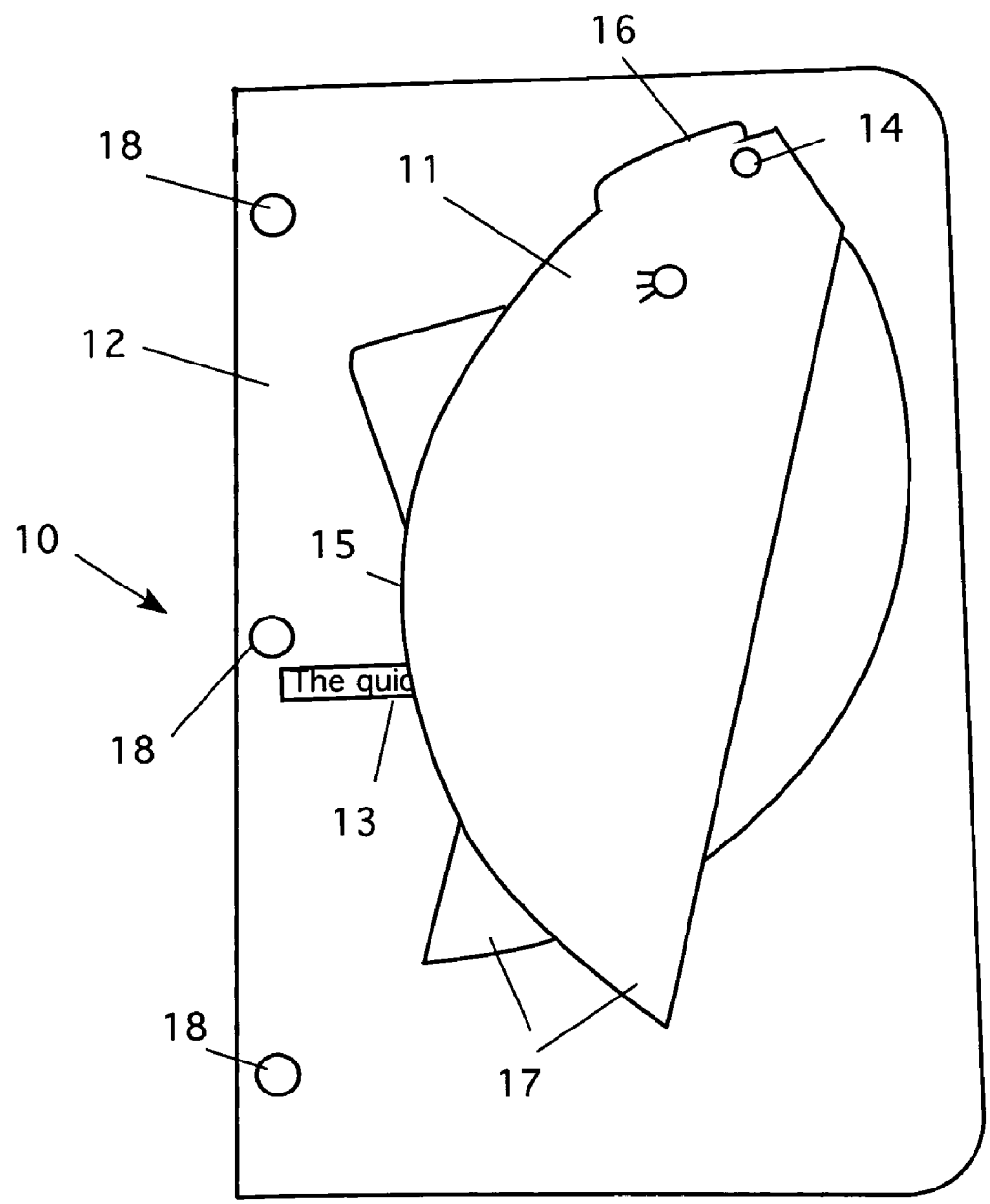
FIG. 4 is a top view of a second embodiment of the invention on a page with the slider an advanced position revealing some words of a line on a page.

FIG. 4 is a top view of a second embodiment 10 of the invention on a page with a slider 11 in an advanced position revealing some words of a line on a page. In this embodiment, the slider 11 is again fastened to a page overlay 12. A window 13 is formed as before that is used to reveal words and letters as described above. In this embodiment, the slider has the form of a fish. This is done solely for the amusement of the student. Note here, the placement of the fastener 14 in this embodiment. The fastener is on the opposite side of the page overlay that that of the first embodiment. Note also that in this embodiment, extra parts have been added to simulate fins and eyes. The top fin serves as a grip for the teacher to use to move the slider while the tail fins serve as the child's grips.

In this embodiment, the trailing edge 15 is a convex curve (as opposed to the concave curve of the first embodiment. This is done to help create the fish shape of the slider. Note, however, that this curve must also be formed to allow it to lie generally upright with respect to the window so that one letter at a time can be revealed as the slider is moved. Finally, a tab 16 is formed on the slider to allow it to be moved. The lower fins 17 can be used to move the slider as well. Note that optional binder holes 18 are shown here as well.

Figure 5:
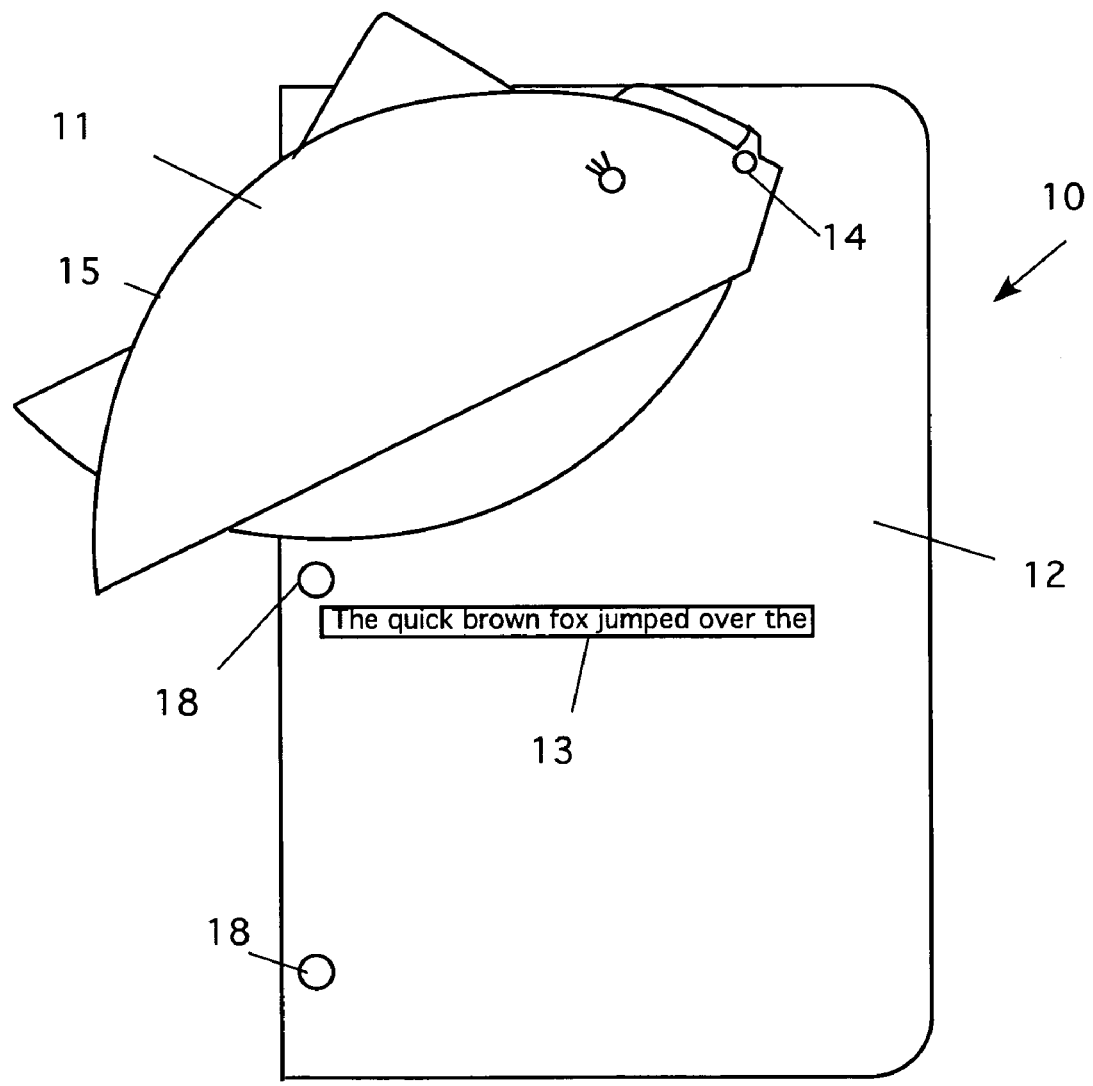
FIG. 5 is a top view of the second embodiment of the invention showing the slider rotated upwards to show the slot and a line of text.

FIG. 5 is a top view of the second embodiment of the invention showing the slider rotated upwards to show the window 13 and a line of text. As before, the window 13 is identical to that of the first embodiment.

Figure 6:
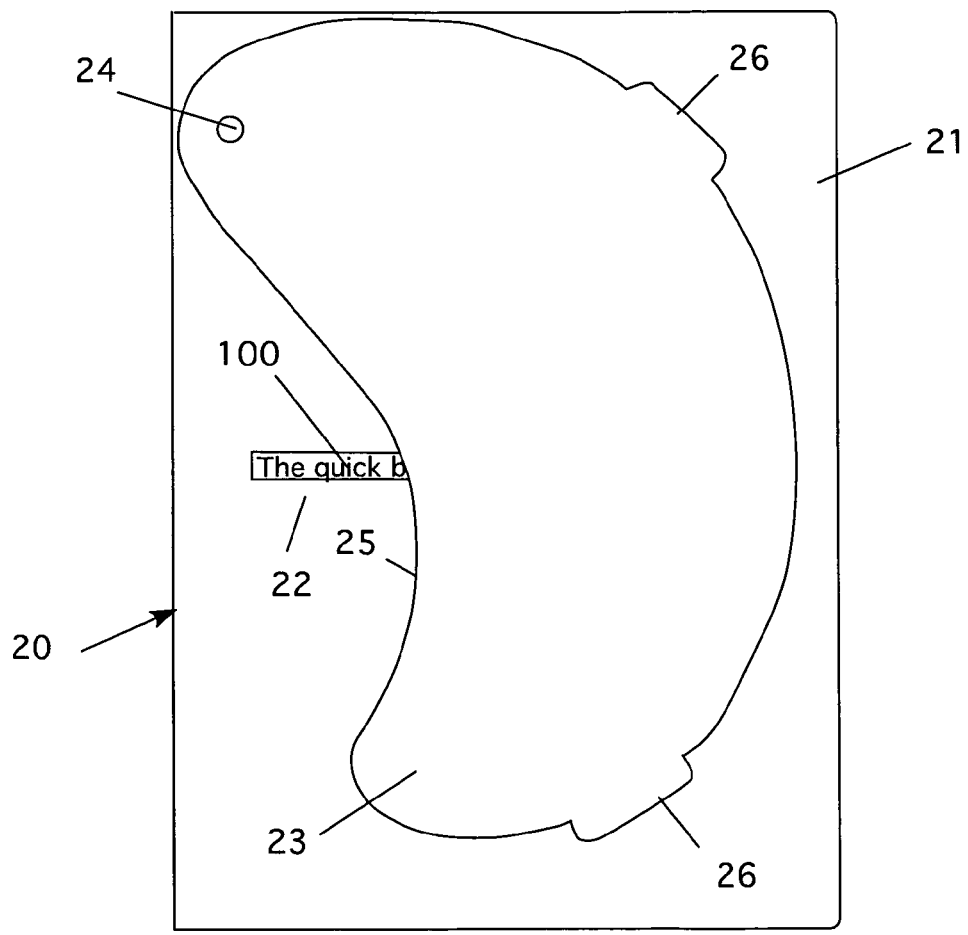
FIG. 6 is a top view of a third (large) embodiment of the invention on a page with the slider in an advanced position revealing some words of a line on a page.

Both the first and second embodiments are scaled for smaller books, typically 5 in×7 in pages. The third embodiment is designed for larger books and papers, being generally sized to fit over a letter size (8.5 in×11 in) page. FIG. 6 is a top view of a third (large) embodiment of the invention on a page with the slider an advanced position revealing some words of a line on a page. Here, again, the device 20 has a page overlay 21 with a window 22 that reveals a line of text 100. A slider 23 is secured to the page overlay with a fastener 24. The slider has a concave trailing edge 25, which is again designed be generally perpendicular to the window as the slider is moved across the page. Tabs, 26 are also provided, as in the earlier embodiment. As noted above, the width of the slider must be sufficient to cover the entire window at the start of the process.

All of these embodiments are intended to have an opaque page overlay for beginning students. This ensures that the students are not distracted by other words on the page. As they progress, a semi-transparent page overlay may be used, which allows the student to see the structures of the words around the window, without being able to clearly see those words. The goal of this tool is to develop efficient decoding skills and visual tracking abilities. Once more-efficient decoding skills and visual tracking ability are established using the decoding window reading tool, most children can then read using only the base page cover with the rectangular window. Eventually they advance to using an edge of the device moved down the page line by line; and finally to using "finger tracking" across the line as they read.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:
1. A decoding reading tool comprising:
a) a page overlay, being generally rectangular and having a top, a bottom, a right side a left side, a height, and a rectangular window having a height, a length and a lateral axis formed therein, whereby the height of said page overlay being at least 5 times as large as the height of said rectangular window; and
b) a sliding cover, having a semi circular shape, pivotably attached to said page overlay at a pivot point at the top of said page overlay, said movable sliding cover also having two control tabs, spaced apart on said sliding cover, and a convex arcuate trailing edge, a height and a width, and further wherein the height of said sliding cover being at least 5 times the height of said rectangular window and the width of said slider being larger than the length of said rectangular window, and further wherein said arcuate trailing edge being formed such that trailing edge of the slider is generally perpendicular to the lateral axis of the slot at any position on said rectangular window.

2. The decoding reading tool of claim 1 wherein said sliding cover is secured to said page overlay by a fastener.

3. The decoding reading tool of claim 1 wherein the rectangular window has a sufficient size to show print sizes from between about 12 to 18 point.

4. The decoding reading tool of claim 1 wherein at least one of said two control tabs can be bent upwards.

5. The decoding reading tool of claim 1 wherein the page overlay further comprises at least one hole for securing the decoding reading tool in a three ring binder.

6. The decoding reading tool of claim 1 wherein said page overlay is opaque.

7. The decoding reading tool of claim 1 wherein the page overlay is translucent.

8. The decoding reading tool of claim 1 wherein the sliding cover has the shape of a fish.

9. The decoding reading tool of claim 1 wherein the page overlay is sized to fit over a 5 inch by 7 inch page.

10. The decoding reading tool of claim 1 wherein the page overlay is sized to fit over an 8 inch by 11 inch page.

11. The decoding tool of claim 1 further comprising at least one finger hole, formed in said sliding cover.

12. The decoding reading tool of claim 1 wherein the pivot point of said sliding cover is located at the right said of said top of said page overlay.

13. The decoding reading tool of claim 1 wherein the pivot point of said sliding cover is located at the left said of said top of said page overlay.

* * * * *